(12) United States Patent
Kobayashi et al.

(10) Patent No.: US 6,885,850 B2
(45) Date of Patent: Apr. 26, 2005

(54) TRANSMISSION POWER CONTROL METHOD AND APPARATUS, AND COMMUNICATION APPARATUS

(75) Inventors: Shouichi Kobayashi, Kanagawa (JP); Hiroki Shinde, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 660 days.

(21) Appl. No.: 09/985,742

(22) Filed: Nov. 6, 2001

(65) Prior Publication Data

US 2002/0065095 A1 May 30, 2002

(30) Foreign Application Priority Data

Nov. 24, 2000 (JP) ..................................... P2000-357709

(51) Int. Cl.[7] ................................................ H04B 1/04
(52) U.S. Cl. ................................ 455/115.1; 455/114.1; 455/114.3; 455/127.1; 375/296
(58) Field of Search ......................... 455/114.1, 114.2, 455/114.3, 115.1, 115.2, 115.3, 115.4, 116, 117, 127.1, 127.2, 127.3, 127.4, 91, 522; 375/295, 296

(56) References Cited

U.S. PATENT DOCUMENTS

| 5,623,486 A | 4/1997 | Dohi et al. |
| 5,638,403 A | 6/1997 | Birchler et al. |
| 6,504,862 B1 * | 1/2003 | Yang .................... 455/127.1 X |
| 6,687,511 B1 * | 2/2004 | McGowan et al. .. 455/127.1 X |

FOREIGN PATENT DOCUMENTS

| EP | 0977355 A2 | 2/2000 |
| JP | 9-139679 | 5/1997 |
| JP | 10-126309 | 5/1998 |
| JP | 11-136210 | 5/1999 |
| JP | 2000-106548 | 4/2000 |
| WO | WO 00/33477 | 6/2000 |
| WO | WO 00/54428 | 9/2000 |

* cited by examiner

Primary Examiner—Quochien B. Vuong
Assistant Examiner—Philip J. Sobutka
(74) Attorney, Agent, or Firm—McDermott Will & Emery LLP

(57) ABSTRACT

A transmission power control apparatus for outputting a transmission data to be filtered by a band-limiting filter (9), includes: a branching unit (81) for branching transmission data before being entered into the band-limiting filter (9); a peak detecting filter (84) having the same structure as that of the band-limiting filter (9), for entering thereinto one of the transmission data branched by this branching unit (81); units (85 to 89) for calculating a correction value capable of suppressing a power peak of the transmission data by being filtered by this peak detecting filter (84); a delaying unit for delaying the other data of the branched transmission data by time required to calculate the correction value; and a correcting unit (83) for correcting the transmission data delayed by this delaying unit (82) based upon the correction value, and thereafter, for entering the corrected transmission data into the band-limiting filter (9).

17 Claims, 7 Drawing Sheets

TRANSMISSION POWER CONTROL METHOD AND APPARATUS, AND COMMUNICATION APPARATUS

BACKGROUND OF THE INVENTION

The present invention is related to a transmission power control technique capable of suppressing a peak of transmission power required in such a case that using of CDMA (Code Division Multiple Access) type portable telephones by a large number of telephone users is overlapped with each other (namely, during user multiplex-use of portable telephones). More specifically, the present invention is directed to a transmission power control method, a transmission power control apparatus, and a communication apparatus, in which a peak of transmission power does not exceed a limit value.

FIG. 7 is a structural diagram of a transmission peak suppressing device employed in a conventional transmission power control apparatus. This transmission peak suppressing device includes a limit unit 21, and a band-limiting filter unit 22. The limit unit 21 compares transmission data of each channel signal with a limiter threshold value. In the case that the transmission data exceeds the limiter threshold value, this limit unit 21 limits the transmission data to a level which does not exceed the limiter threshold value. In this conventional technique, a time rate defined when the transmission data exceeds the limiter threshold value is detected as a present limiter rate, and the limit unit 21 changes the limiter threshold value so that this present limiter rate is approximated to a defined limiter rate which is previously set. Then, the transmission data which has passed through this limit unit 21 will be filtered by the band-limiting filter unit 22, by which the band-limiting process operation is carried out.

It should be noted that the conventional transmission power control technique is described in, for instance, Japanese Patent Publication No. Hei. 11-136210.

In the above-explained conventional technique, before the transmission data is inputted into the band-limiting filter unit 22, the limit unit 21 limits the amplitude value as to this transmission data in order to suppress the peak factor. As a result, before the transmission data is entered into the band-limiting filter unit 22, the peak factor can be suppressed. However, due to the gain owned by the band-limiting filter unit 22, another peak factor is produced in the transmission signal outputted from the band-limiting filter unit 22. There is such a problem that this peak factor could not be suppressed.

SUMMARY OF THE INVENTION

The present invention has been made to solve the above-explained problem, and therefore, has an object to provide a transmission power control method, a transmission power control apparatus, and a communication apparatus, capable of suppressing an occurrence of a peak factor during user multiplex-use of portable telephones.

The above-described object may be achieved by such a transmission power control method of a communication apparatus, in which transmission data before being entered into a band-limiting filter is branched; one data of the branched transmission data is filtered by a peak detecting filter having the same structure as that of the band-limiting filter so as to acquire a correction value capable of suppressing a power peak of the transmission data; the other data of the branched transmission data is delayed by time required to acquire the correction value; and thereafter, the delayed transmission data is corrected based upon the correction value to be entered into the band-limiting filter; wherein: a maximum value of the power peak of the transmission data filtered by the peak detecting filter is acquired every 1 sampling time; and the maximum value is compared with a peak suppressing threshold value to thereby acquire the correction value.

In the above-described transmission power control, preferably, a maximum value among power values which are acquired every oversampling time within the 1 sampling time is used as the maximum value of the power peak of the 1 sampling time. Also, when the maximum value is increased every 1 sampling time, each of the maximum values is compared with the peak suppressing threshold value so as to acquire the correction value. Even when the maximum value is decreased, the maximum value before being decreased is held during a predetermined sampling period, and is compared with the peak suppressing threshold value so as to acquire the correction value.

Further, in the transmission power control method, preferably, in the case that the maximum value is decreased after a time instant when the maximum value was decreased up to a time instant when the predetermined sampling period has passed, an updated maximum value is employed instead of the held maximum value so as to be compared with the peak suppressing threshold value. Also, as the updated maximum value, a maximum value acquired within a sampling period immediately after the predetermined sampling period is employed, or a larger maximum value is employed between the maximum value and a maximum value within a sampling period immediately before the predetermined sampling period.

Moreover, in the above-explained transmission power control method, preferably, only when the maximum value exceeds the peak suppressing threshold value, the correction value is acquired; and when the maximum value does not exceed the peak suppressing threshold value, the correction is not carried out. Also, a subtraction value calculated between the maximum value and the peak suppressing threshold value is used as the correction value.

In the transmission power control operation according to the present invention, while the correction value is acquired which may suppress the peak power of the transmission data before being entered into the band-limiting filter, the maximum value of the transmission power which is compared with the peak suppressing threshold value is continuously updated (namely, every time 1 sampling time has passed). As a consequence, the waveform precision can be maintained with respect to the transmission data, and the communication quality can be maintained under better condition even during user multiplex-use of portable telephones.

DETAILED DESCRIPTION OF THE PREFERRED EMBODIMENT

Referring now to drawings, an embodiment of the present invention will be described.

Figure 1:
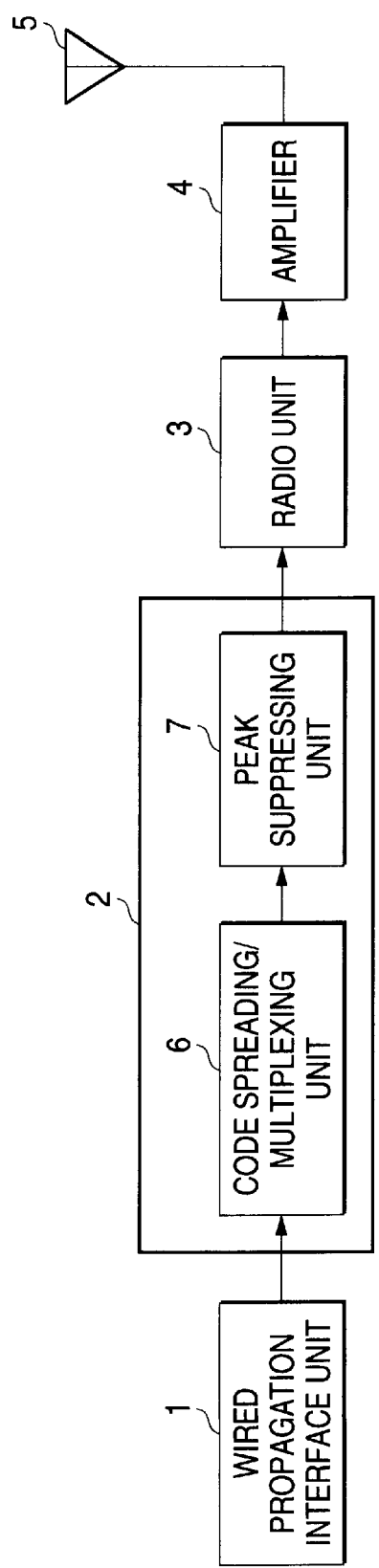
FIG. 1 is a structural diagram of a communication apparatus equipped with a transmission power control device according to an embodiment of the present invention.

FIG. 1 is a structural diagram of a communication apparatus having a transmission power control device according to an embodiment of the present invention. This communication apparatus includes a wired propagation path interface unit 1, a transmission baseband unit 2, a radio unit 3, an amplifier 4, and a transmission antenna 5. The transmission baseband unit 2 is connected to an output of the wired propagation path interface unit 1. The radio unit 3 is connected to an output of the transmission baseband unit 2. The amplifier 4 amplifies an output signal of the radio unit 3. The transmission antenna 5 radiates the signal amplified by the amplifier 4 to an atmospheric area. The transmission baseband unit 2 includes employing a code spreading/multiplexing unit 6, and a peak suppressing unit 7.

In this communication apparatus, transmission data outputted from the wired propergation path interface unit 1 is inputted into the transmission baseband unit 2. With respect to this transmission data, the code spreading/multiplexing unit 6 performs both a code spreading operation and a user multiplexing operation. Then, a peak factor of the code-spread/multiplexed transmission data is suppressed by the transmission peak suppressing unit 7. Thereafter, the transmission data outputted from the transmission baseband unit 2 is converted into an analog signal by the radio unit 3. After this analog signal is amplified, the amplified analog signal is outputted from the transmission antenna 5.

Figure 2:
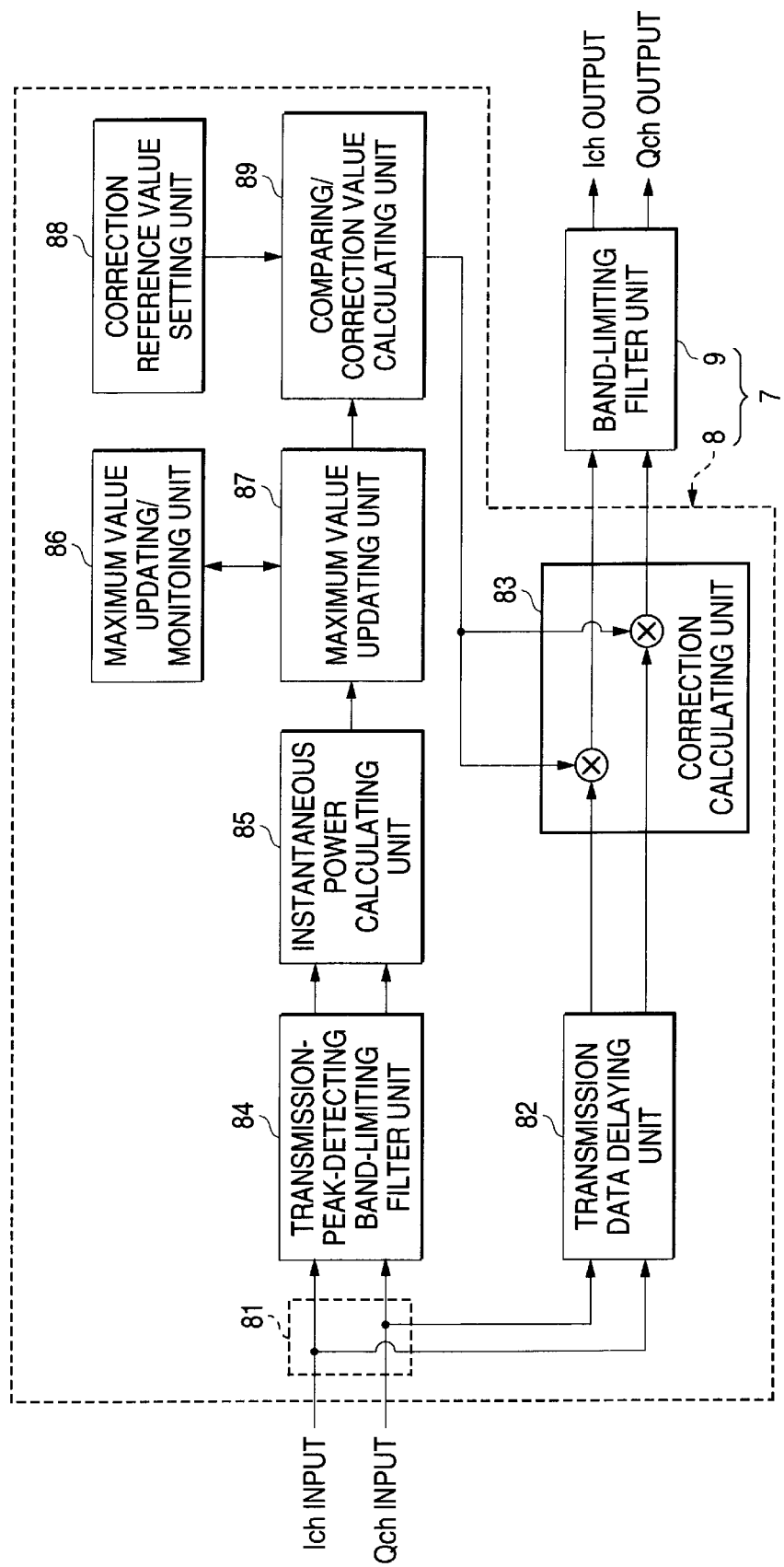
FIG. 2 is a detailed structural diagram of a peak suppressing device shown in FIG. 1.

FIG. 2 is a structural diagram of a transmission peak suppressing unit (indicated by reference numeral 7 of FIG. 1) which is mounted on the communication apparatus (see FIG. 1) using the CDMA system, according to the embodiment of the present invention. This transmission peak suppressing unit 7 includes a limiter unit 8 and a band-limiting filter unit 9.

In the limiter unit 8 according to this embodiment, transmission data before being entered into the band-limiting filter unit 9 is not merely limited by a threshold value, but the peak factor of the signal outputted from the band-limiting filter unit 9 is suppressed in advance. To this end, the limiter unit 8 is equipped with a signal branching unit 81, a transmission data delaying unit 82, and a correction calculating unit 83. The signal branching unit 81 branches at an input stage thereof, an input signal of transmission data having two components (namely, I-channel component and Q-channel component) on two coordinate axes which are intersected perpendicular to each other. The transmission data delaying unit 82 applies a predetermined delay time with respect to one set of the two branched I-channel/Q-channel components. The correction calculating unit 83 corrects the delayed transmission data to output the corrected transmission data to the band-limiting filter unit 9.

This predetermined time used to delay the signal by the transmission data delaying unit 82 corresponds to such time required to calculate a correction value applied to the correction calculating unit 83. This correction value is obtained from the other set of the two I-channel/Q-channel signals (components) which are branched by the signal branching unit 81. This correction signal is produced by the following arrangement.

That is, the correction signal producing arrangement includes a band-limiting filter unit 84 for detecting a transmission peak, an instantaneous power calculating unit 85, a maximum value updating/monitoring unit 86, a maximum value updating unit 87, a correction reference value (peak suppressing threshold value) setting unit 88, and a comparing/correction calculating unit 89. The transmission-peak-detecting band-limiting filter unit 84 enters thereinto the other sets of the I-channel signal and the Q-channel signal, which are branched by the signal branching unit 81, and owns the same structure of the above-explained band-limiting filter unit 9. The instantaneous power calculating unit 85 enters thereinto the output signal of this filter unit 84 so as to calculate an output power instantaneous value of the filter unit 84. The maximum value updating unit 87 updates a maximum value based upon the instantaneous power values calculated by the maximum value updating/monitoring unit 86 and the instantaneous power calculating unit 85. The correction reference value setting unit 88 determines an upper limit value of a peak. The comparing/correction calculating unit 89 compares the maximum value of the maximum value updating unit 87 with the upper limit value of the peak which is set by the correction reference value setting unit 88 so as to calculate a correction value.

Next, operations of the above-explained limiter unit 8 will now be explained.

Figure 3:
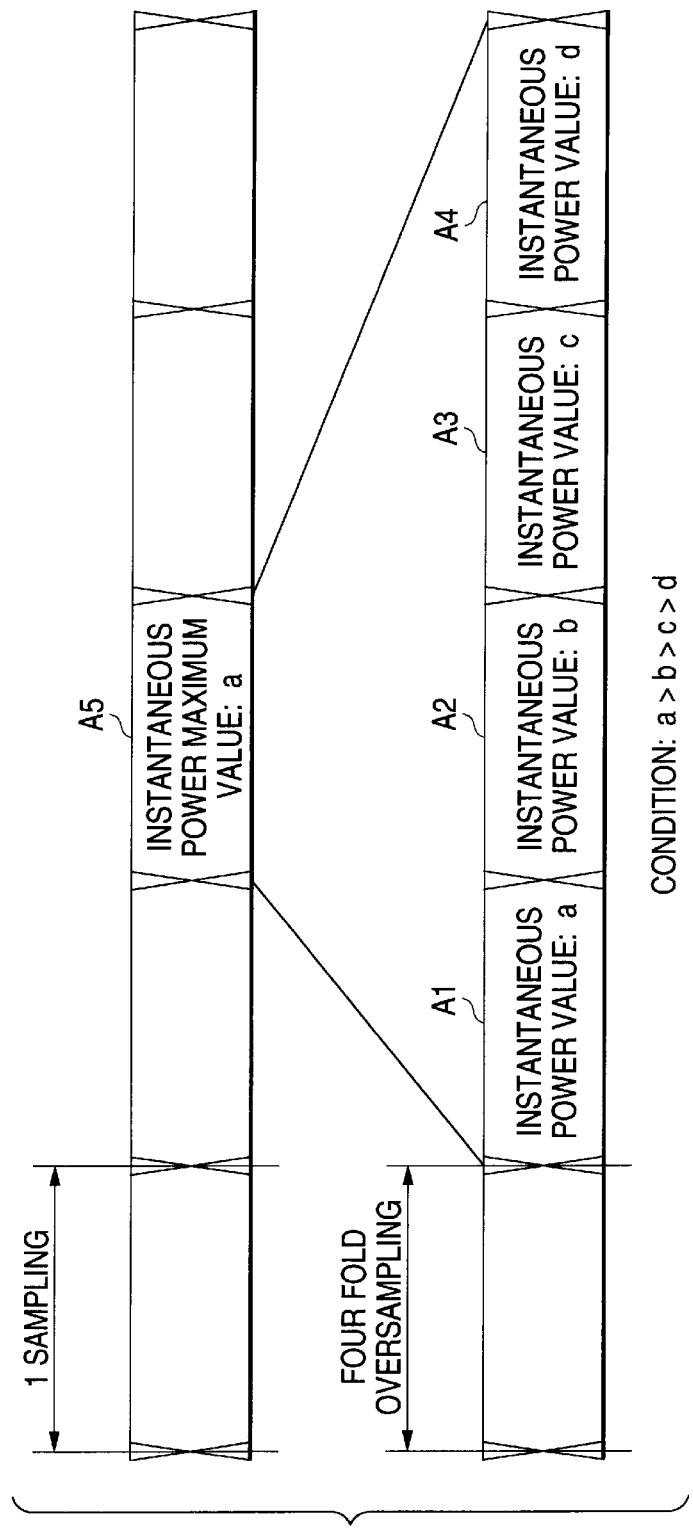
FIG. 3 is an explanatory diagram for explaining operations in which a maximum value contained in fourfold-oversampled data is detected within 1 sampling period.

To detect both a peak of transmission data in the I channel and another peak of transmission data in the Q channel, before this transmission data is entered into the band-limiting filter unit 9, such a transmission data obtained by branching this transmission data is entered into the transmission-peak-detecting band-limiting filter unit 84. Then, the instantaneous power calculating unit 85 calculates an instantaneous power value based upon the output signal of the transmission-peak-detecting band-limiting filter unit 84. The calculation of this instantaneous power value is carried out every oversampling time during one sampling time. FIG. 3 is an explanatory diagram for explaining operations in which instantaneous power values are calculated every time fourfold oversampling time A1, A2, A3, A4 has passed within one sampling time A5. In this case, assuming now that the respective instantaneous power values are "a", "b", "c", "d", a relationship among these instantaneous power value is defined by a>b>c>d.

The maximum value updating unit 87 acquires a maximum value (in above example, instantaneous power value "a" is maximum value) within the sampling time among the instantaneous power value (in above example, a, b, c, and d) which are calculated by the instantaneous power calculating unit 85 every time the oversampling time has passed. The maximum value updating unit 87 compares the maximum value during the sampling time with the maximum instantaneous power value obtained before 1 sampling time so as to update the maximum value. In the example of FIG. 3, the maximum power value "a" is set to such a maximum value within this 1 sampling time among the respective instantaneous power values a, b, c, d within the four sets of oversampling time (A1, A2, A3, A4). The maximum value updating/monitoring unit 86 monitors both a maximum value update section and an update condition (will be discussed later) of the maximum value updating unit 87.

Figure 4:
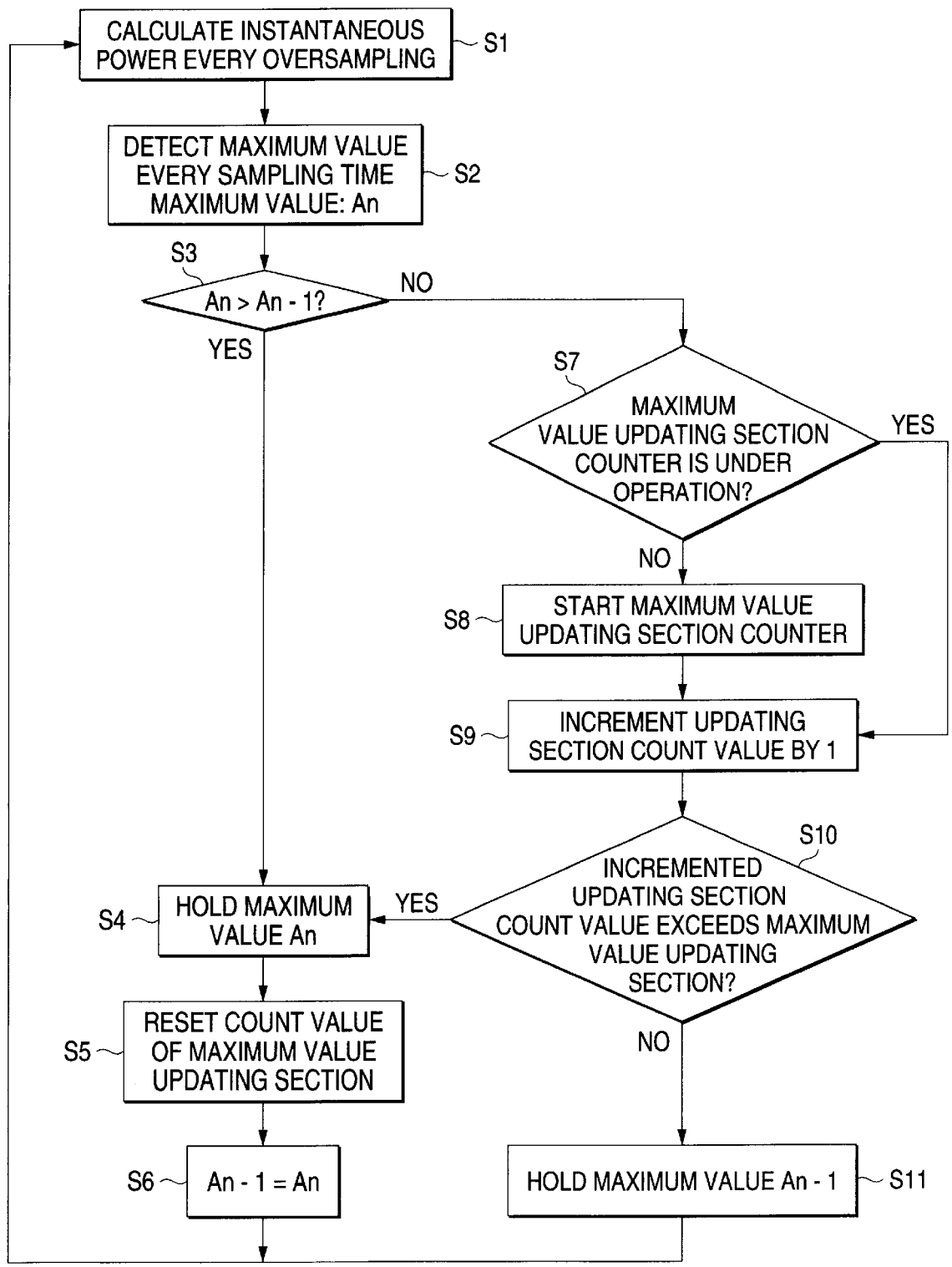
FIG. 4 is a flow chart for describing a maximum value updating algorithm.

FIG. 4 is a flow chart for describing an algorithm of a maximum value updating process operation by the limiter unit. The instantaneous power calculating unit 85 shown in FIG. 2 calculates an instantaneous power value every oversampling time from the output signal of the transmission-peak-detecting band-limiting filter unit 84 (step S1). The maximum value updating unit 87 acquires this instantaneous power value every oversampling time so as to detect a maximum value "An" within the sampling time (step S2). The maximum value updating unit 87 compares this maximum value "An" with such a maximum value "An−1" which has been held up to one preceding sampling time (step S3). In the case that the maximum value updating unit 87 judges that the presently-acquired instantaneous power value "An" is larger than the previously-held instantaneous power value "An−1", the process operation is advanced to a further step S4 at which this value "An" is held as the maximum value (step S4).

At this next step S5, a count value of a counter for a maximum value updating section (will be explained later with reference to FIG. 5 and FIG. 6) is reset. At the next step S6, the maximum value updating unit 87 sets this maximum value "An" as "An−1" in order to use this maximum value as a judgment value for updating a maximum value in the next time, and then the process operation is advanced to updating operation of a maximum value during next sampling time (return to step S1).

In the case that the comparison result at the step S3 becomes "NO", namely An−1≧An (i.e., when power value is lowered), the process operation is advanced from the step S3 to a step S7 at which the maximum value updating unit 87 judges as to whether or not the counter for the maximum value updating section is under counting operation, which is held by the maximum value updating/monitoring unit 86. When the counter for the maximum value updating section is under counting operation, the process operation jumps from this step S7 to a step S9. At this step S9, the counter for the maximum value updating section is incremented by 1. To the contrary, when the counter for the maximum value updating section is not counted, the process operation is advanced to a step S8 at which the counting operation of the maximum updating section counter is commenced. Next, the process operation is advanced to the step S9 at which the count value of this maximum value updating section counter is increased.

After the step S9, the process operation is advanced to a step S10 at which the maximum value updating unit 87 judges as to whether or not the count value of the maximum value updating section counter exceeds the maximum value updating section. When the count value exceeds the maximum value updating section, the process operation is advanced to the step S4 at which the presently-acquired maximum value "An" is held as the maximum value. To the contrary, when it is so judged at the step S10 that the count value of the maximum value updating counter does not exceed the maximum value updating section, the process operation is advanced to a further step S11 at which the value "An−1" is held as the maximum value. Then, the process operation is advanced to the maximum value updating operation for the next sampling time (namely, process is returned to previous step S1).

Figure 5:
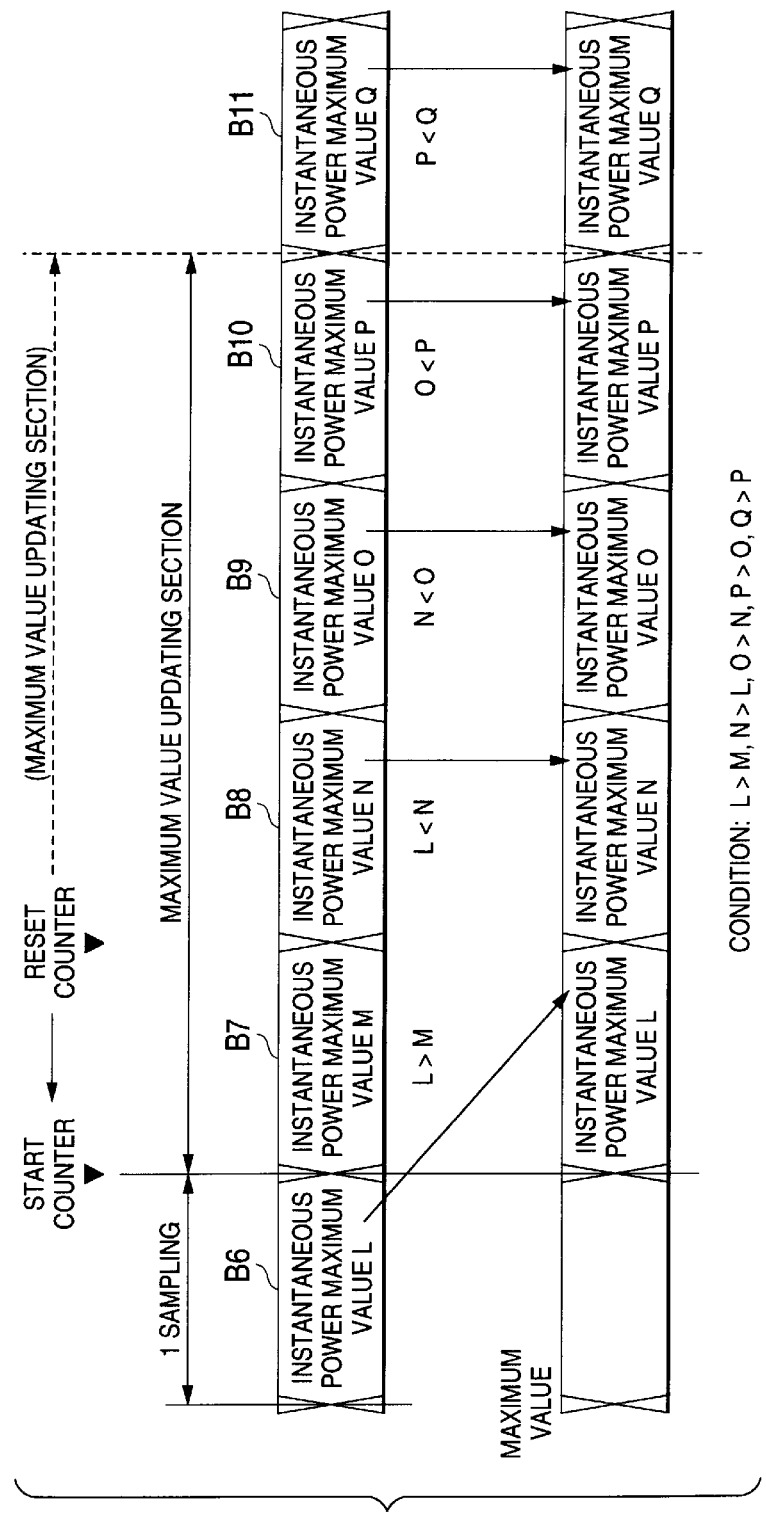
FIG. 5 is an explanatory diagram for explaining maximum values held by a maximum value updating unit shown in FIG. 2 in the case that there is such a trend that an instantaneous power maximum value is increased.
Figure 6:
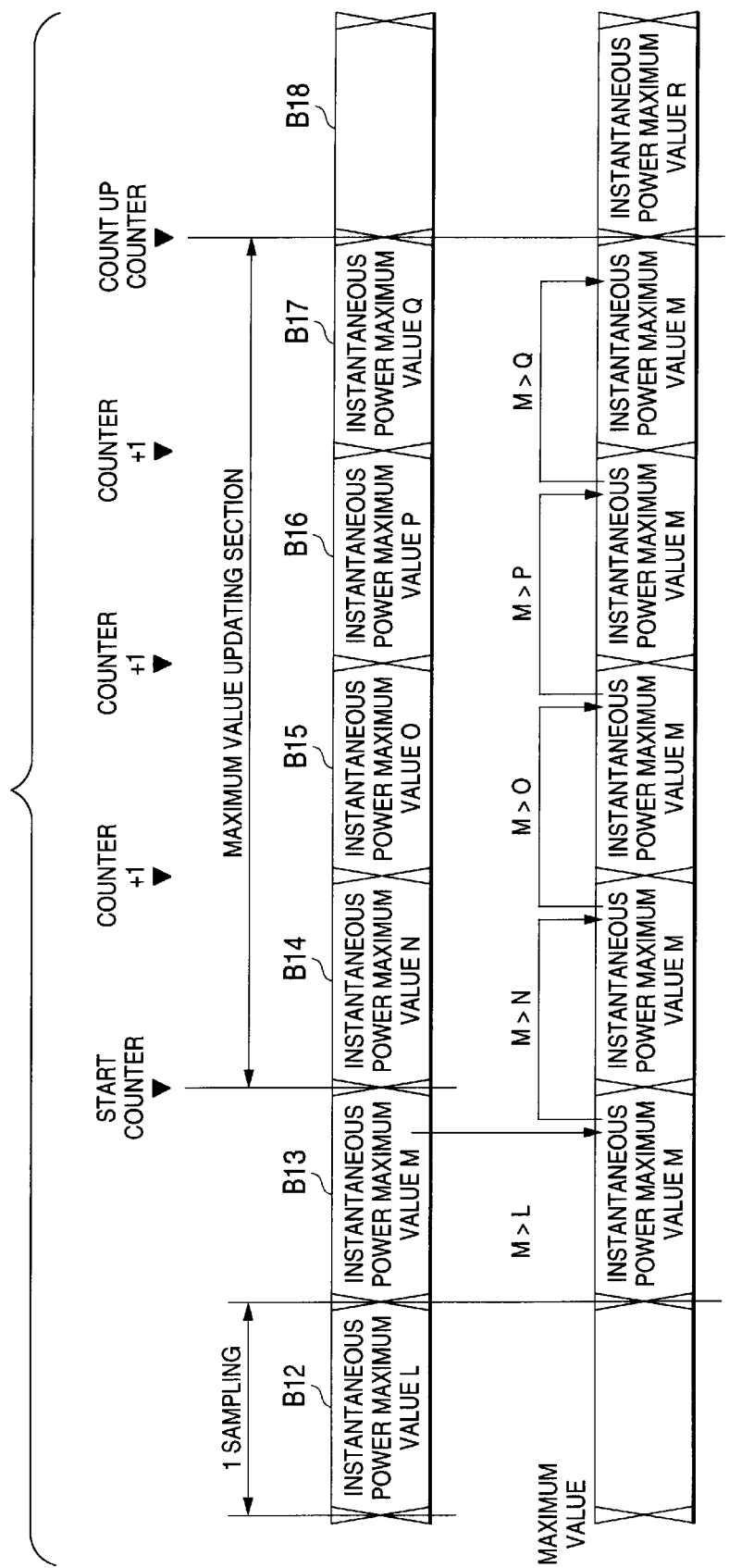
FIG. 6 is an explanatory diagram for explaining maximum values held by the maximum value updating unit in the case that there is such a trend that an instantaneous power maximum value is decreased, and a maximum value after a maximum value updating section is ended.
Figure 7:
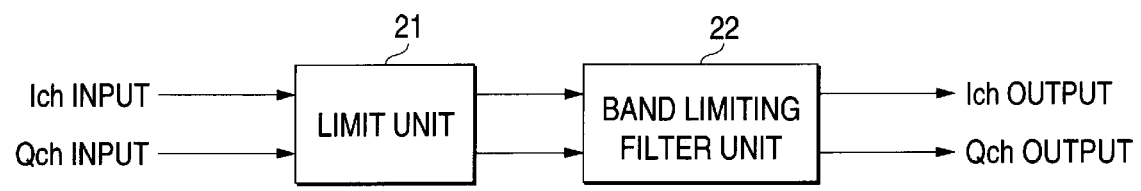
FIG. 7 is a structural diagram for showing the conventional peak suppressing device.

FIG. 5 and FIG. 6 are diagrams for representing an example of a maximum value updating operation of a maximum value updating algorithm. In the example of FIG. 5, the maximum value updating section is set to 4 sampling sections. In this embodiment, while a maximum value updating section is set, even when a maximum value of instantaneous power is instantaneously lowered within this maximum value updating section, the value of the maximum value is not immediately lowered in response to lowering of this maximum value, but only lowering of the maximum value of the instantaneous power which exceeds this section may be reflected as a variation of the maximum value. While the maximum value updating section is not set, even when lowering of the maximum value of the instantaneous power is immediately reflected as lowering of the maximum value, a peak factor may be eventually suppressed. However, in the case that the maximum value is updated based upon the instantaneously appearing values of instantaneous power, the work loads required for performing the correction calculations are increased. Also, the peak factors are excessively suppressed. To avoid this problem, the maximum value updating section is provided in this embodiment.

In the example of FIG. 5, the respective maximum values of the instantaneous power as to the respective sampling time B6, B7, B8, B9 and B10 are selected to be L, M, N, O and P. In this case that there is such a trend that a change in maximum values is increased within the maximum value updating section (in FIG. 5, M<N<O<P), no counting operation is carried out as to the maximum value updating section counter. In this example of FIG. 5, while L>M is set, when the operation is entered into the sampling time B7, since L>M (lowering condition of maximum value) is present, the process operation is advanced from the step S3 to the steps S7 and S8 defined in FIG. 4, at which the counting operation of the maximum value updating section counter is commenced. Furthermore, the process operation is advanced to the step S9, the step S10, and the steps S11, at which the value M of the sampling time B7 is not held, but the value L is continuously held as the instantaneous power maximum value.

However, when the process operation is entered to the next sampling time B8, since the maximum value is N>L, the process operation is advanced from the step S3 to the steps S4 and S5 of FIG. 4, at which the value N is held as the instantaneous power maximum value, and also the maximum value updating section counter is reset, so that the counting operation of the maximum value updating section is interrupted, or stopped. Subsequently, in this example of FIG. 5, since there is such a trend that the maximum value of the instantaneous power is increased, the instantaneous power maximum values O, P, Q, which are calculated are held as maximum values (lower stage of FIG. 5).

In the example of FIG. 6 (also, maximum value updating section is selected to be 4 sampling sections in this example), maximum values of sampling time B13, B14, B15, B16, B17 are set as L, M, N, O, P, Q. Different from the case of FIG. 5, in this case, a magnitude relationship is defined as M>L, M>N, M>O, M>P, M>Q. In the example of FIG. 6, there is such a trend that a change in maximum values is decreased over an entire range within this maximum value updating section after the counting operation of the maximum value updating counter is commenced. As a consequence, a maximum value within this section is fixed as the value "M", and when the counter counts 4 sampling time, this counter is counted up.

As to a value of a maximum value (namely, value "R" of FIG. 6) after this maximum value updating section counter is counted up, since the process operation is advanced from the step S10 to the step S4 in the flow chart of FIG. 4, such an instantaneous power maximum value (namely, value of sampling time B18 in example of FIG. 6) obtained just after the maximum value updating section is switched is held as a maximum value "R" after the updating section is ended. It should be noted that as a value "R" of a maximum value obtained after the maximum value updating section counter is counted up, the respective instantaneous power maximum values obtained before/after the maximum value updating section is switched (B17/B18 of FIG. 6) are compared with each other, and then, the larger instantaneous power maximum value may be employed as the maximum value "R."

The comparing/correction value calculating unit 89 of FIG. 2 compares an arbitrary power reference value (peak suppressing threshold value of transmission power) set by the correction reference value setting unit 88 with the maximum values (namely, maximum values indicated in respective lower stages of FIG. 5 and FIG. 6) held by the maximum value updating unit 87. Then, in the case that the maximum value held in the maximum value updating unit 87 exceeds the above-explained power reference value, a subtraction result obtained between the maximum value of the maximum value updating unit 87 and the above-explained power reference value is calculated as a correction value. Conversely, in the case that the maximum value of the maximum value updating unit 87 does not exceed the power reference value, equally-multiplied correction value may be employed.

These correction values are supplied to the correction calculating unit 83, and then, are multiplied by the transmission data of both the I channel and the Q channel, the correction timing of which are adjusted (delayed) by the transmission data delaying unit 82. The multiplied transmission data is entered into the band-limiting filter unit 9.

As previously described, the transmission data is previously inputted into the transmission-peak-detecting band-limiting filter unit 84 having the same structure as that of the band-limiting filter unit 9 so as to obtain the correction value capable of suppressing the peak factor, and then, the transmission data entered into this band-limiting filter unit 9 is corrected by using this correction value. As a consequence, the peak of the transmission data outputted from the band-limiting filter unit 9 can be suppressed under better condition.

In accordance with the present invention, the peak of the transmission data outputted form the band-limiting filter unit can be suppressed, and the transmission data can be corrected in a manner that while the waveform precision can be maintained, this communication quality can be maintained under better condition. Also, while the user multiplex-use of the portable telephones and the communication quality can be maintained under better conditions and further the better frequency characteristic can be kept, the data can be transmitted, the region for compensating the linearity of the amplifier can be reduced. As a result, the system can be made compact and operated under low power consumption.

What is claimed is:

1. A transmission power control method of a communication apparatus, comprising steps of:
   branching transmission data before being entered into a band-limiting filter;
   acquiring a correction value capable of suppressing a power peak of the transmission data by filtering one data of said branched transmission data by a peak detecting filter having the same structure as that of said band-limiting filter;
   delaying the other data of said branched transmission data by time required to acquire said correction value; and
   correcting the delayed transmission data based upon said correction value to be entered into said band-limiting filter,
   wherein a maximum value of the power peak of said transmission data filtered by said peak detecting filter is acquired every 1 sampling time,
   wherein said maximum value is compared with a peak suppressing threshold value to acquire said correction value.

2. A transmission power control method as claimed in claim 1,
   wherein a maximum value among power values which are acquired every oversampling time within said 1 sampling time is used as the maximum value of the power peak of said 1 sampling time.

3. A transmission power control method as claimed in claim 2,
   wherein when said maximum value is increased every 1 sampling time, each of the maximum values is compared with said peak suppressing threshold value to acquire said correction value.

4. A transmission power control method as claimed in claim 2,
   wherein even when said maximum value is decreased, said maximum value before being decreased is held during a predetermined sampling period, and is compared with said peak suppressing threshold value to acquire said correction value.

5. A transmission power control method as claimed in claim 4,
   wherein when said maximum value is decreased after a time instant when said maximum value was decreased up to a time instant when said predetermined sampling period has passed, an updated maximum value is employed instead of said held maximum value to be compared with said peak suppressing threshold value.

6. A transmission power control method as claimed in claim 5,
   wherein as said updated maximum value, a maximum value acquired within a sampling period immediately after said predetermined sampling period is employed, or a larger maximum value is employed between said maximum value and a maximum value within a sampling period immediately before said predetermined sampling period.

7. A transmission power control method as claimed in claim 1,
   wherein only when the maximum value exceeds said peak suppressing threshold value, said correction value is acquired,
   wherein when the maximum value does not exceed said peak suppressing threshold value, said correction is not carried out.

8. A transmission power control method as claimed in claim 7,
   wherein a subtraction value calculated between said maximum value and said peak suppressing threshold value is used as said correction value.

9. A transmission power control apparatus comprising:
   a branching unit for branching transmission data before being entered into a band-limiting filter;
   a peak detecting filter having the same structure as that of said band-limiting filter, for entering thereinto one data of said transmission data branched by said branching unit;
   a correction value calculating unit for acquiring a correction value capable of suppressing a power peak of said transmission data by filtering the transmission data by said peak detecting filter;

a delay unit for delaying the other data of said branched transmission data by time required to acquire said correction value; and a correcting unit for correcting said transmission data delayed by said delay unit based upon said correction value, and thereafter for entering said corrected transmission data into said band-limiting filter, wherein said correction value acquiring unit acquires a maximum value of the power peak of the transmission data filtered by said peak detecting filter every 1 sampling time, and compares said acquired maximum value with a peak suppressing threshold value to obtain said correction value.

10. A transmission power control apparatus as claimed in claim 9, wherein a maximum value among power values which are acquired every oversampling time within said 1 sampling time is used as the maximum value of the power peak of said 1 sampling time.

11. A transmission power control apparatus as claimed in claim 10, wherein when said maximum value is increased every 1 sampling time, each of the maximum values is compared with said peak suppressing threshold value to acquire said correction value.

12. A transmission power control apparatus as claimed in claim 10, wherein even when said maximum value is decreased, said maximum value before being decreased is held during a predetermined sampling period, and is compared with said peak suppressing threshold value to acquire said correction value.

13. A transmission power control apparatus as claimed in claim 12, wherein in the case that said maximum value is decreased after a time instant when said maximum value was decreased up to a time instant when said predetermined sampling period has passed, an updated maximum value is employed instead of said held maximum value to be compared with said peak suppressing threshold value.

14. A transmission power control apparatus as claimed in claim 13, wherein as said updated maximum value, a maximum value acquired within a sampling period immediately after said predetermined sampling period is employed, or a larger maximum value is employed between said maximum value and a maximum value within a sampling period immediately before said predetermined sampling period.

15. A transmission power control apparatus as claimed in claim 9, wherein only when the maximum value exceeds said peak suppressing threshold value, said correction value is acquired, wherein when the maximum value does not exceed said peak suppressing threshold value, said correction is not carried out.

16. A transmission power control apparatus as claimed in claim 15, wherein a subtraction value calculated between said maximum value and said peak suppressing threshold value is used as said correction value.

17. A communication apparatus comprising:

a branching unit for branching transmission data before being entered into a band-limiting filter;

a peak detecting filter having the same structure as that of said band-limiting filter, for entering thereinto one data of said transmission data branched by said branching unit;

a correction value calculating unit for acquiring a correction value capable of suppressing a power peak of said transmission data by filtering the transmission data by said peak detecting filter;

a delay unit for delaying the other data of said branched transmission data by time required to acquire said correction value; and a correcting unit for correcting said transmission data delayed by said delay unit based upon said correction value, and thereafter for entering said corrected transmission data into said band-limiting filter, wherein said correction value acquiring unit acquires a maximum value of the power peak of the transmission data filtered by said peak detecting filter every 1 sampling time, and compares said acquired maximum value with a peak suppressing threshold value to obtain said correction value.

* * * * *